United States Patent

[11] 3,601,162

[72] Inventor Victor John Page
Saltdean, England
[21] Appl. No. 847,212
[22] Filed Aug. 4, 1969
[45] Patented Aug. 24, 1971
[73] Assignee Neumo Limited
Peacehaven, Sussex, England
[32] Priority Aug. 7, 1968
[33] Great Britain
[31] 37703/68

[54] WIPER
6 Claims, 1 Drawing Fig.
[52] U.S. Cl. ................................................ 141/90,
15/306 R
[51] Int. Cl. ............................................... B65b 3/04
[50] Field of Search........................................ 15/306, 306
A, 308, 316, 316 A, 405, 300, 301, 303; 134/64,
122; 141/85, 89–91, 115; 222/148; 239/106;
34/107, 155

[56] References Cited
UNITED STATES PATENTS
722,738  3/1903  Mendham ................... 141/85

1,575,526  3/1926  Bocher ......................... 15/306 A UX
2,194,565  3/1940  Moss ............................ 15/316 R X
2,750,091  6/1956  Mattimoe et al. .......... 141/279 X
3,270,364  9/1966  Steele .......................... 15/306 A Primary Examiner—Laverne D. Geiger
Assistant Examiner—Edward J. Earls
Attorney—Baldwin, Wight & Brown ABSTRACT: Wiping apparatus for use with a tubular probe for filling containers with liquids comprising a wiper block formed with a bore within which the probe is slidable, the block being formed with a plurality of radially inwardly directed jets opening into the bore which jets are connected to a source of pressurized gas, usually air. The probe is closed at its lower end with an enlargement into which the jets open and preferably also the block is formed with an annular chamber disposed radially outwardly of and in fluid communication with the jets, the chamber being connected to the source of pressurized gas. When the probe is withdrawn from a filled container, air issuing from the jets forces liquid adhering to the outside of the probe into the container, thus wiping the probe clean.

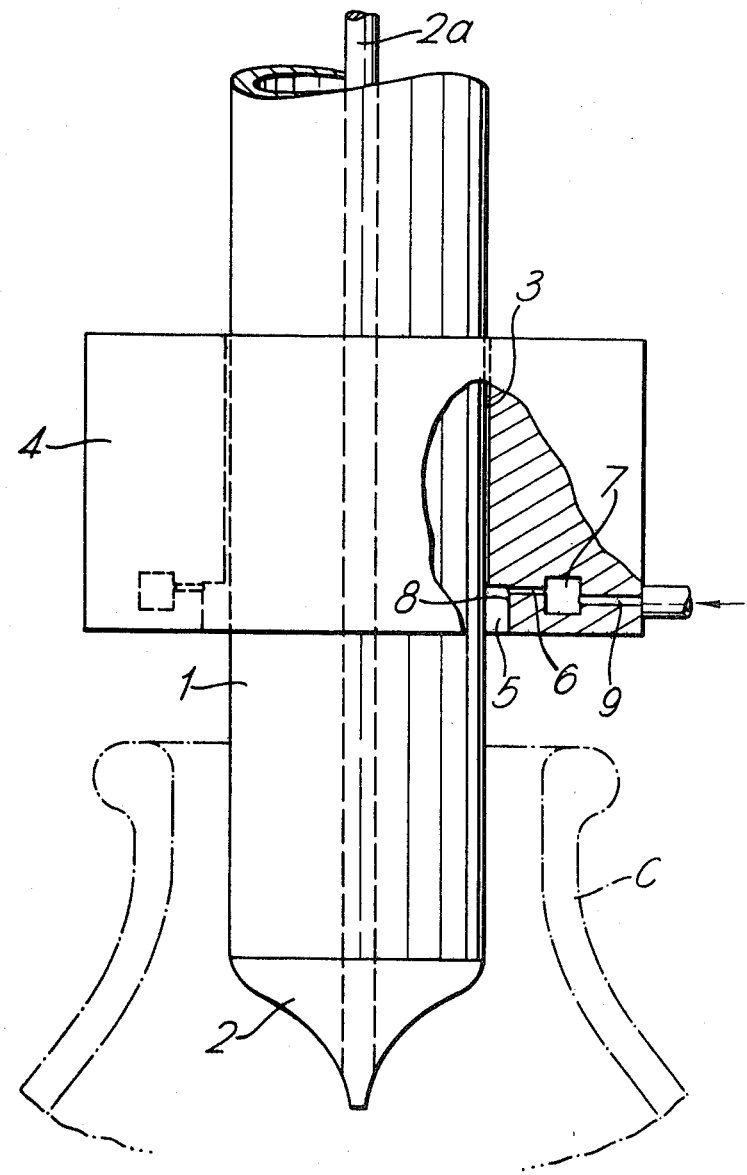
Inventor:
Victor John Page
BY Baldwin Wight Diller & Brown
Attorneys

WIPER

This invention relates to apparatus for filling containers with liquids and in particular to the type of filling apparatus (hereinafter referred to as "the type set out"), wherein a filler probe and a container are arranged for relative movement with respect to each other in order to allow insertion of the probe before filling the container and withdrawal of the probe after filling has been completed.

This invention is concerned with a wiper assembly for removal of surplus liquid remaining on the outer surface of the probe upon extraction from a liquid within a filled container.

It has been found that when filling containers with liquids, for example shampoos, which are inclined to froth, it is necessary to insert the probe, through which liquid is discharged into the container, until its end is close to the bottom of the container. This provides a speedy method of filling the container with liquid but a problem remains in that liquid tends to adhere to the outside surface of the probe on withdrawal from the liquid in the filled container.

The problem of wiping the probe when withdrawn from the liquid, has caused considerable concern, especially in instances when liquids such as virulent poisons or caustic solutions or the like are being handled.

The present invention seeks to provide a wiper to remove, speedily and efficiently, any residual liquid adhering to a probe on extraction of the probe from a filled container, and so avoid splashing the area surrounding the outside of the filled container.

The invention also seeks to provide a wiper with the ability to remove completely any residual liquid on the end of the filler probe.

According to the present invention there is provided a filling head for use with a container-filling apparatus of the type set out comprising a generally upright tubular filling probe, a wiper block formed with a bore within which the probe is slidable and with a plurality of inwardly directed jets opening into said bore and adapted to be connected to a source of gaseous fluid under pressure.

In a preferred embodiment the jets are disposed radially and perpendicularly to the axis of said bore.

Preferably also the lower end of said bore is enlarged to form a pressure chamber and the jets enter said chamber adjacent the upper end thereof.

According to another aspect of the invention the lower end portion of the probe has a cusp-shaped longitudinal cross section.

The invention, will now be described by way of example only with reference to the accompanying drawing, in which the FIGURE is a fragmentary view, partly in cross section, of a filler probe and a wiper block, the probe being shown in position prior to its insertion into a container.

Referring to the drawing, a hollow, cylindrical probe 1 is closed at its lower end by an end cap 2 which, as can be seen in the drawing, has a cusp-shaped longitudinal cross section. The cap 2 is mounted on the end of a rod 2a extending axially up through the probe and thus by lowering and raising the rod and cap 2 with respect to the probe its lower end can be opened and closed.

In use the probe is inserted into a container C until the end cap 2 nears the bottom of the container. The lower end of the probe is then opened by lowering the end cap 2 and liquid thus flows down the inside of the probe and so into the container.

The probe 1 is slidably mounted, with a loose fit in a bore 3 of a wiper block 4. The lower end of the bore 3 is of enlarged diameter to define a pressure chamber 5. A plurality of horizontally radially disposed air injection jets 6 open through a sidewall of the pressure chamber 5 adjacent its upper end and communicate with an annular chamber 7 in the block 4. An air inlet duct 9 extends from the annular chamber to the outside of the block.

The combined assembly functions in the following manner. The air inlet duct 9 is connected to any suitable external source of air pressure and a certain uniform pressure of air builds up within the annular chamber 7 so that air is forced through the small-bore air injection jets 6, into the pressure chamber 5.

The filler probe 1, having considerable freedom of movement within the bore 3, allows a small volume of air to escape up the bore 3 from the pressure chamber 5. Since only a small volume of air can escape up through the bore 3, it follows that there is resistance to flow in the bore and consequently a back pressure in the chamber 5 that is sufficient to inhibit the entry of liquid wetting the outside of probe 1 into the interior of pressure chamber 5. Therefore, as the probe 1 is raised through the wiper block 4, after completion of the filling of the liquid container, any liquid adhering to the probe 1 is wiped down the probe onto the end cap 2.

Since the end cap 2 is cusp-shaped the airstream follows the concave form and wipes the liquid to and off the extreme tip of the cap 2. The airstream is thus able to remove the last remaining drops of liquid back into the container.

It can be seen from the foregoing that surplus liquid is removed speedily and efficiently from the filler probe as it is extracted from the liquid in the container.

At the same time, since the wiping medium is air, neither solvents, acids, alkalines, abrasives or the like, can have any deleterious effects on the wiper, neither can additional freedom of movement of the filler tube within the bore, caused through wear by abrasion or any other action, affect the ability of the system to remove liquid from the probe.

It will be realized however that although the invention has been specifically described with reference to air as the gaseous medium, clearly other gases such as nitrogen or helium can be used where an inert nonoxidizing medium is required.

What is claimed is:

1. In an apparatus for filling containers with liquids comprising a tubular filling probe arranged for relative axial movement with respect to a container to be filled so as to allow its insertion into the container for delivering fluid into the container and to allow its withdrawal from the container after delivery of fluid has been completed, the improvement comprising a wiper block formed with a bore the end of which to be positioned adjacent the container is enlarged to provide a pressure chamber, said probe being slidable within said bore and through said pressure chamber, said block being formed with a plurality of inwardly directed jets opening into said pressure chamber, and means adapted to connect said jets to a source of gaseous fluid under pressure, whereby gaseous fluid from said jets and said pressure chamber forces liquid on the outside of said probe downwardly along said probe and off the delivery end thereof and into said container upon the withdrawal of the probe therefrom through said wiper block.

2. The improvement according to claim 1 wherein a portion of said bore extends above said pressure chamber and provides a loose-fit mounting for said probe to thereby to allow a small volume of said gaseous fluid to escape upwardly through said bore, the gaseous fluid pressure in said pressure chamber being sufficient to inhibit the entry of liquid wetting the outside of said probe into said pressure chamber.

3. The improvement according to claim 1 wherein said jets extend radially and perpendicularly to the axis of said bore.

4. The improvement according to claim 3 comprising an annular chamber disposed radially outwardly of said jets and in fluid communication therewith, and an inlet duct extending between said annular chamber and an outside surface of the block to allow connection with said source of gaseous fluid.

5. The improvement according to claim 1 wherein the probe is formed with a cap on its lower end, said cap having a cusp-shaped profile.

6. In an apparatus for filling containers with liquids the improvement comprising a wiper block formed with a bore, a probe slidable within said bore and being formed on its lower end with a cap having a cusp-shaped profile with an extreme tip at its lower end, said block being formed with a plurality of radially inwardly directed jets disposed in a plane perpendicular to the axis of said bore, said bore being enlarged at the lower end thereof to form a pressure chamber and said jets opening into said chamber adjacent its upper end, an annular chamber disposed radially outwardly of said jets and in fluid communication therewith, a duct connecting said annular chamber with an outside surface of the block and means adapted to connect said duct to a source of gaseous fluid under pressure, whereby upon the withdrawal of the probe from a container through said wiper block, gaseous fluid under pressure from said jets and said pressure chamber forces liquid adhering to the outside of said probe downwardly off said cap extreme tip and into said container.